United States Patent [19]
Chakravarti et al.

[11] Patent Number: 5,369,695
[45] Date of Patent: Nov. 29, 1994

[54] METHOD OF REDIRECTING A TELEPHONE CALL TO AN ALTERNATE DESTINATION

[75] Inventors: Vandana S. Chakravarti, Tinton Falls, N.J.; R. Paul Christmann, Irving, Tex.; Steven F. Knittel, West Allenhurst, N.J.; Margaret H. Redberg, Red Bank, N.J.; William T. Shampine, Freehold, N.J.; Lindsay A. Shur, Middletown, N.J.; Dawn E. Staniforth, Holmdel, N.J.

[73] Assignee: AT&T Corp., Murray Hill, N.J.

[21] Appl. No.: 817,225

[22] Filed: Jan. 6, 1992

[51] Int. Cl.$^5$ .................. H04M 3/42; H04M 11/04; H04M 15/00; H04M 7/00
[52] U.S. Cl. .................. 379/211; 379/46; 379/127; 379/207; 379/212; 379/220; 379/230
[58] Field of Search .............. 379/212, 211, 210, 265, 379/266, 213, 214, 142, 46, 201, 207, 230, 219, 220, 221, 127

[56] References Cited

U.S. PATENT DOCUMENTS

| | | | |
|---|---|---|---|
| 4,723,273 | 2/1988 | Diesel et al. | 379/211 |
| 5,018,194 | 5/1991 | Suzuki et al. | 379/207 |
| 5,023,868 | 6/1991 | Davidson et al. | 370/62 |
| 5,237,604 | 8/1993 | Ryan | 379/210 X |

*Primary Examiner*—James L. Dwyer
*Assistant Examiner*—Harry S. Hong
*Attorney, Agent, or Firm*—Frederick B. Luludis

[57] ABSTRACT

A facility is provided for redirecting a call from one destination point in a communications network to another destination point in the event that the call is not answered within a predetermined period of time, or in the event that after the call has been answered, the called party requests such redirection.

18 Claims, 4 Drawing Sheets

| CALL TYPE | DESTINATION CODE |
|---|---|
| RINGING VALUE | REDIRECTION CODE |
| TIMER | |
| ⋮ | |
| | |

601 – CALL TYPE
602 – DESTINATION CODE
603 – RINGING VALUE
604 – REDIRECTION CODE
605 – TIMER
600

FIG.3

| CALL TYPE | DESTINATION CODE | | |
|---|---|---|---|
| RINGING VALUE | REDIRECTION CODE | | |
| TIMER | RPR | RD | |
| ⋮ | | | |
| | | | |

602, 606 – RPR, 607 – RD, 600

METHOD OF REDIRECTING A TELEPHONE CALL TO AN ALTERNATE DESTINATION

FIELD OF THE INVENTION

This invention relates to redirecting a telecommunication call, which may be in one of a number of different active call states, to an alternate destination.

BACKGROUND OF THE INVENTION

Interexchange carriers offer what is commonly referred to as 800 services. The 800 service feature offers a business customer a number of advantages. For example, an 800 telephone number may be associated with the business customer rather than with the customer's associated telephone equipment. As another example, calls placed to an 800 number may be directed to one of a number of the customer's associated locations based on the time of day. That is, for example, if a particular customer happens to be associated with two geographically diverse locations, the customer could request that the associated interexchange carrier direct calls placed to the customer's 800 number during a particular part of the day to one location and, at other times of the day, to the other location.

It is likely, however, that a call that has been forwarded to one location associated with a business customer may go unanswered, A business which does not (or cannot for whatever reason) answer business calls may possibly suffer an economic loss in the form of lost sales, since a calling party may decide to call a competing business.

It is also likely that one business location, upon answering an incoming call, may find that the call needs to be redirected (transferred) to another associated location. In that instance, the person who answered the call would establish an independent outgoing call connection to the other location and then bridge that connection to the incoming call connection. It is apparent that redirecting an answered incoming call to another associated location is an inefficient use of telephone facilities, since it entails establishing a second independent call connection.

SUMMARY OF THE INVENTION

An advance in the art of processing telephone calls is achieved in accord with the invention by arranging a telephone network switch so that after forwarding an incoming call to an intended destination the switch responds to any one of a number of conditions requiring redirection of the call by redirecting the call to an alternate destination identified as a function of a redirect code derived from associated calling information. As an aspect of the invention, such conditions include the case of ring no answer and the case in which an answering party requests such redirection. As another aspect of the invention, a network switch obtains a redirection code from a centralized network data base which derives the redirection code from calling information supplied by the switch.

DETAILED DESCRIPTION

Figure 1:
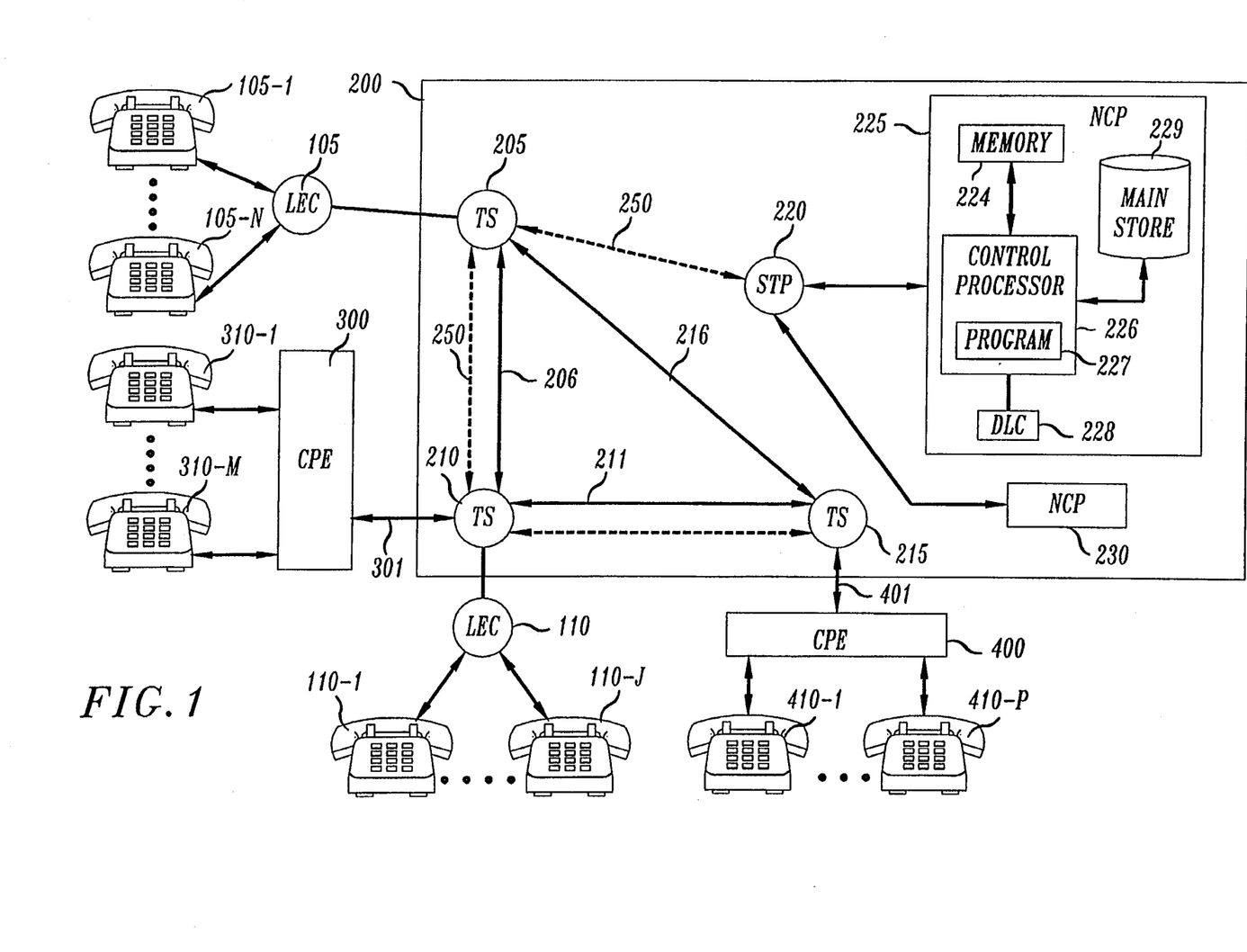
FIG. 1 is a broad block diagram of a telecommunications network in which the principles of the invention may be practiced.

FIG. 1 illustrates communications network 200 which may be, for example, the well-known AT&T public switched network. As is well-known, the AT&T network provides long distance voice and data services for its subscribers, for example, the subscribers associated with station sets 105-1 through 105-N. The AT&T network also provides a numbers of services for its business customers. One such service allows a business customer's communications equipment to connect directly to network 200, as opposed to being connected through a Local Exchange Carrier (LEC). Such equipment are commonly referred to as Customer Premises Equipment (CPE), such as, for example, CPEs 300 and 400. A CPE may be, for example, a private branch exchange, a key telephone system, or what is commonly referred to as an automatic call distributor. In addition, a particular business customer may be associated with a number of CPEs geographically separated from one another. In such a case, it is likely that each CPE would connect to a different point in network 200.

More specifically, network 200 includes a number of interconnected Toll Switches (TS), three of which, TS 205, 210 and 215, are shown in the FIG. Such toll switches may be any one of a number of well-known types of switching equipment, such as, for example, the well-known No. 4ESSν electronic switching system commercially available from AT&T. In a typical case, a toll switch serves a number of LECs, two of which are shown in the FIG. As is well-known, a LEC is arranged to connect a calling station (originator), e.g., station 105-1, that has dialed a particular telephone number to an associated toll switch, e.g., TS 205. A LEC is also arranged to receive a telephone call from its associated toll switch and forward the call to an intended station set via a respective communications path. Similarly, a toll switch may also serve a number of different CPEs, such as CPEs 300 and 400. The operation of a CPE is somewhat analogous to the operation of a LEC. That is, both operate to interface telephone station sets with a communications network, such as network 200.

Network 200 also includes a data link 250 connected to each of the toll switches. Data link 250, which may be, for example, the well-known Common Channel Signaling System Network (CCS), is arranged so that the toll switches may exchange messages with one another to establish via network 200 a long distance telephone connection between a calling station and a called station. It is seen from the FIG. that network 200 includes a number of centralized data bases commonly referred to as Network Control Points (NCP). The NCPs, for example, NCPs 225 and 230, are positioned at various locations within network 200 and each is interconnected with one of the toll switches via a respective Signal Transfer Point (STP) 220. In this way, the NCPs support the provision of various network 200 services and features, such as, for example, the aforementioned 800 service.

More specifically, a customer—for example, a business customer associated with CPEs 300 and 400—may subscribe to such network 200 services, for example, the 800 service. To this end, the business customer is assigned a particular 800 number. Alternatively, the business customer may subscribe to a number of particular 800 numbers and associate such numbers with respective business locations. However, for the sake of clarity and simplicity and not by way of limitation, assume that the business customer has subscribed to just one 800 service number. Thereafter, the business customer in conjunction with a particular business activity may publicly announce the assigned 800 number. A telephone user who responds to such activity and dials the announced 800 number, is then connected via an associated LEC and network 200 to a telephone station set served by the business customer's communications equipment.

Specifically, assume that station 105-1 is the calling station and the user thereat has dialed the assigned 800 number. LEC 105 upon receipt of the dialed 800 number establishes a connection to TS 205 and passes to it the digits forming the dialed number. TS 205, responsive to receipt of the assigned 800 number, sends a request message to one of the NCPs via CCS 250 and STP 220. TS 205 does so for the purpose of ascertaining the destination of the associated call. Such a request message includes a number of fields identifying, inter alia, TS 205, a destination group index, the dialed 800 number, and a call set up identifier. STP 220 uses the destination group index to route the request message to the appropriate NCP. STP 220 also uses the call identifier to associate a subsequent NCP response message with the proper request message.

Assume that STP 220 forwards the request message to NCP 225. It is seen from the FIG. that an NCP, e.g., NCP 225, includes, inter alia, a control processor 226, which operates under the control of a program stored in program memory 227, and a Data Link Controller (DLC) 228, which operates to transmit and receive data messages to and from the toll switches via STP 220. An NCP also includes a main store unit 229, which may be, for example, a number of memory disc units. As is well known, main store unit 229 contains translation data that is used to translate a telephone number accompanying a request message into a primary destination code. Such a destination code may be either the address of a destination toll switch, e.g., TS 210, or a telephone number identifying the called station. If the destination code is a telephone number, then TS 205, in a conventional manner, translates the telephone number into an address identifying the destination toll switch.

The results of the NCP 225 translation may also include, in accord with an aspect of the invention, a ringing timer value and a call redirect code. In accord with an aspect of the invention, a call redirect code may be, for example, either an address identifying a secondary, or alternate, destination or a redirect telephone number. The purpose of the ringing timer value and redirect code will be made apparent below.

Thus, upon receipt of the request message, NCP 225 translates the dialed 800 number into a destination code as well as a ringing timer value and redirect code. NCP 225 then incorporates the latter information and the aforementioned call identifier into a response message and forwards the message to STP 220. STP 220, in turn, routes the message via network 250 to TS 205 based on the message call identifier. TS 205, responsive to receipt of the message, stores the destination code, redirect code and ringing timer value in a call register established for the call. TS 205 then routes the call to the toll switch identified by the destination, for example, TS 210. In doing so, TS 205 sends to TS 210 via network 250 a so-called Initial Address Message (IAM) containing, inter alia, the call destination code, which may be a telephone number. Upon receipt of the IAM message, TS 210 translates the destination code contained in the message into a number identifying the trunk group interconnecting TS 210 with the business customer's telephone equipment, e.g., CPE 300. TS 210 then selects an idle trunk from the identified trunk group and forwards the 800 service call to CPE 300 over the selected trunk.

CPE 300, in turn, acknowledges receipt of the call by returning a conventional wink signal to TS 210 via the established path. TS 210, responsive to the latter signal, returns to TS 205 via network 250 a so-called address complete message indicating that the call has been advanced to its intended destination. Upon receipt of the latter message, TS 205, in accord with an aspect of the invention, starts a ringing timer to time for receipt of an indication that the associated call has been answered, i.e., successfully completed. That is, when the associated call is answered at one of the station sets 310-1 through 310-M, then CPE 300 returns a second conventional wink signal to TS 210. Upon receipt of the latter signal, TS 210 sends to TS 205 via network 250 a call completion message noting that the call has been answered.

Figure 2:
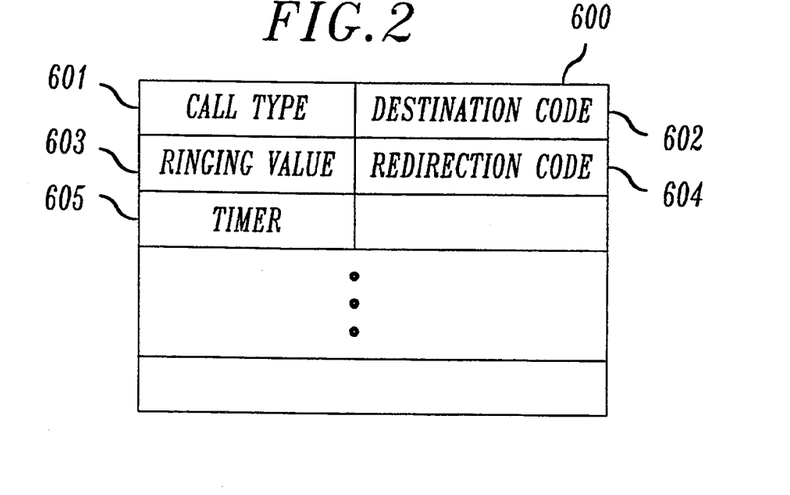
FIGS. 2 and 3 illustrate a telephone call register that is associated with a call that is processed by a toll switch of FIG. 1 in accord with the principles of the invention.

Turning now to FIG. 2, there is shown an illustrative example of a call register that is established in the internal memory of an associated toll switch, e.g., TS 205. It is seen that call register 600 comprises a number of fields which hold data associated with a call. Included in that data is an indicator 601 (which defines the associated class of service, e.g., 800 service), destination code 602, ringing value 603, and redirection code 604. In accord with an aspect of the invention, TS 205 uses the ringing value contained in field 603 as a means of determining the number of ringing cycles (equivalently the amount of time) it should wait before redirecting the call to an alternate location specified by the contents of field 604. As a further aspect of the invention, the business customer has the option of specifying the ringing value that a toll switch, e.g., TS 205, obtains from NCP 225 and that is inserted in field 603. In this way, the business customer may control the number of ringing cycles that a toll switch should wait before the switch redirects an associated call to the specified alternate location.

Continuing, field 605 of the call register is the means for implementing the associated ringing timer, or counter, and is used to track the number of ringing cycles specified by the contents of field 603. In particular, TS 205, responsive to receipt of the associated address complete message, starts the ringing timer by initializing the contents of field 605. TS 205 does so to insure that the timer starts at a predefined value, e.g., zero. Thereafter, TS 205 periodically—illustratively once a second—increments the contents of field 605 and compares the value of such contents with the value contained in field 603. If TS 205 receives the aforementioned call completion message before the value of ringing timer 605 at least equals ringing value 603, then TS 205 terminates its maintenance of the ringing timer. However, if TS 205 does not receive that message before the value of timer 605 at least equals ringing value 603, then, in accord with an aspect of the invention, TS 205 redirects the call to the alternate (secondary) location defined by the contents of field 604.

In the latter case, TS 205, in a conventional manner, releases the connection to TS 210. TS 205 then, via network 250, sends a conventional IAM message to the toll switch identified by the redirect (destination) code contained in field 604 in order to establish a call connection to the latter switch. In the present illustrative example, assume that the redirect code identifies TS 215 serving CPE 400. When the call connection is established, TS 205 then forwards the associated call to TS 215 for presentation to CPE 400. At this point, further processing of the call follows conventional procedures. That is, if the associated call is answered, then the call connection established via network 200 is terminated only after either the calling or called party has terminated the call in a conventional manner. If, on the other hand, the call is not answered or a busy signal is returned, then the call connection is terminated when the calling party terminates the call.

In accord with an aspect of the invention, the foregoing may be carried out repetitively so as to implement multiple redirections of the same call. This feature is particularly advantageous for those business customers that may be associated with more than two locations. In such a situation, the prescribed number of ringing cycles could be small, e.g., four, so that redirection of a call from a first location to a second location and thence to a third location would not be unduly delayed.

In particular, in accord with an aspect of the invention, a redirection code may define a secondary 800 service number. If that is the case, then, for the above illustrative example, TS 205 tests the contents of field 604 to determine if it defines an 800 service number. If that is the case, then TS 205 sends to NCP 225 a request message containing the secondary 800 service number. Similarly, upon receipt of that message, NCP 225 translates the secondary 800 number into a destination code, ringing timer value and possibly another redirect code. In this instance, the new redirect code could be either another secondary destination code or another 800 service number. Moreover, the new timer value could be the same as or different from the prior timer value.

Upon receipt of the latter message, TS 205, operating in the manner discussed above, then forwards the call to the toll switch whose identity is determined as a function of the newly received destination code, for example, TS 215. Similarly, TS 205 then starts the associated timer 605 upon receipt of the aforementioned address complete message, and then waits for receipt of a call completion message. If TS 205 receives the latter message before the counter 605 value at least equals the new ringing value, then TS 205 proceeds in the described manner and terminates the established connection when the associated call is terminated. Similarly, if the call completion message is not received within the prescribed number of ringing cycles, then TS 205 releases the connection between itself and TS 215, and redirects the call in accord with the new, or second, redirect code. As mentioned above, the latter code may be still another 800 service number, which would cause TS 205 to once again send to NCP 225 a request message containing the latest 800 service number, thereby reiterating the redirect process.

It is to be understood, of course, that such multiple redirects could be used in those situations where a customer is associated with just one business location. In such a situation, a call which is not answered within the prescribed amount of time may then be redirected to a conventional answering service. Alternatively, the redirect code, or number, may be used to redirect such an unanswered call to the customer's home. If the call still goes unanswered, then a second redirect code (or second of multiple redirects) may be then used to redirect the call to the answering service, and so on.

In accord with the invention, the foregoing may be readily applied to a situation wherein a called 800 service number is busy. For example, if the aforementioned trunk group at TS 210 does not contain an idle trunk (i.e., an all circuits busy condition is present), then TS 210 returns to TS 205 via network 250 a so-called release message. TS 205, in response to receipt of that message, releases the connection to TS 210 and then redirects the 800 number service call in accord with the contents of field 604 of the associated call register (record). Similarly, the contents of field 604 may contain either another destination code or a secondary 800 service number. In the latter instance, then, call redirection may be invoked for a busy condition encountered at a second alternate destination and encountered at a third alternate destination, and so on. Moreover, such redirection may be invoked when either a busy condition is encountered or the call is not answered within the prescribed number of ringing cycles.

Call redirection, in accord with the invention, is readily applicable to the post ringing case, especially when the interface between network 200 and a particular CPE, e.g., CPE 300 or 400, is a digital interface, such as, for example, an ISDN (Integrated Services Digital Network) interface.

As is well known, an ISDN interface includes a Primary Rate Interface (PRI) and a Basic Rate Interface (BRI), each conforming with the well-known Q.931 message protocol. A digital facility, e.g., a so-called T1 carder line, which implements the PRI interface, provides 24 digital channels. Twenty-three of the 24 channels are information channels assigned to respective calls (voice or data). The remaining channel is a signaling channel between network 200 and the particular CPE.

Referring once again to FIG. 1, assume that communications connections 301 and 401 are digital facilities, e.g., so-called T1 carrier lines implementing the PRI interface.

In particular, if a user positioned at a station set, e.g., station 105-1, dials the 800 service number assigned to the business customer associated with CPEs 300 and 400, then, in the manner described above, the call is advanced to TS 205. As described above, TS 205, responsive to receipt of the call, forms a request message and sends the message to NCP 225 via network 250 and STP 220. Assuming that the business customer has subscribed to call redirection for ring no answer and for post ringing, then, as also described above, NCP 225 in response to the request message forms a response that includes, inter alia, a destination code, ringing timer value, and redirection code. In accord with an aspect of the invention, the response message also includes an indicator (flag) indicating that the business customer has also subscribed to call redirection for post ringing. Upon receipt of the message, TS 205 stores the information contained therein in respective fields of call register 600 established for the associated call. An illustrative example of the information that is now contained in register 600 is shown in FIG. 3.

Figure 3:
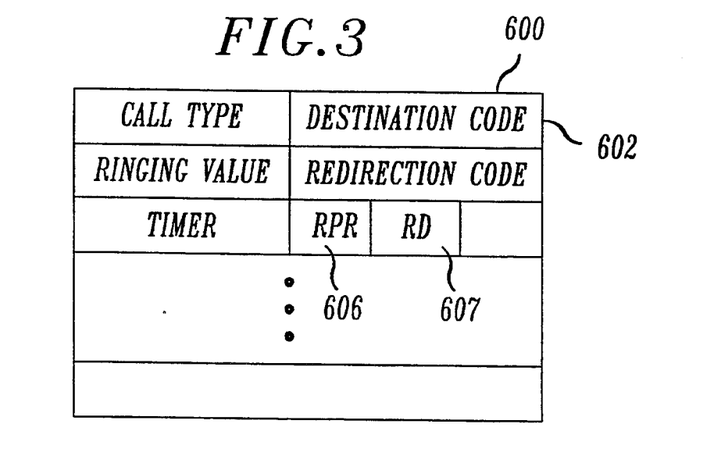

It is seen from FIG. 3, that TS 205 has stored in field 606 of register 600 the aforementioned flag designated RPR (Redirection Post Ringing). Assuming that the destination code stored in field 602 of record 600 identifies TS 210, then, in the manner discussed above, TS 205 forwards the call to TS 210 by sending to the latter an IAM message. In accord with an aspect of the invention, the IAM message includes RPR flag contained in field 606 of the associated call register 600. Upon receipt of the IAM message and thence the associated call, TS 210 selects an idle channel of digital communications facility 301 and forwards the call to CPE 300 over that channel. In doing so, TS 210 sends to CPE 300 via the associated facility 301 signaling channel a Q.931 message identifying the incoming call.

Upon receipt of the call, CPE 300 establishes a connection between the selected facility 301 channel and one of the station sets 310-1 through 310-N, e.g., 310-1. In doing so, CPE 300 supplies to station set 310-1 an alerting signal, i.e., a ringing signal. The person associated with that station set and responsive to the alerting signal would answer the incoming (i.e., goes "off-hook"), thereby completing the call connection between station sets 105-1 and 310-1.

Assume at this point that the station set 310-1 user who answers the call decides, for whatever reason, that the call ought to be redirected to a station set associated with CPE 400. To effect that function, the station 310-1 user sends to CPE 300 a signal indicating that the call is to be redirected. Such a signal may be generated by the station 310-1 user momentarily operating (interrupting) the station 310-1 switch hook. The station 310-1 user then enters via the station set keypad the telephone number identifying the station set to which the call is to be redirected, for example, the telephone number assigned to CPE 400. CPE 300 responsive to receipt of the signal and subsequent digits of the CPE 400 telephone number, creates a Q.931 call release (disconnect) message. Such a message may include, inter alia, a release code, the call identity, redirect code, and redirect telephone number. CPE 300 then sends the message via the aforementioned 301 signaling channel to TS 210. Upon receipt of the release message, TS 210 releases the associated channel, thereby making the channel available for another incoming or outgoing call. In addition, TS 210 sends to TS 205 a release message containing, inter alia, the call identifier, redirection number and RPR flag.

TS 205, responsive to receipt of the message, releases the connection to TS 210, and stores in field 607 (FIG. 3) of the associated call record an RD (ReDirect) flag to identify that the call is a redirected call. TS 205 then redirects the call in accord with the received redirection number. That is, if the received redirection number is not an 800 service number, then TS 205 translates the received redirection telephone number into a destination code identifying a particular destination switch. e.g., TS 215. Armed with the designation code, TS 205 then, in the manner described above, redirects the call to TS 215 via communications path 216. If the redirection number happens to be a telephone number assigned to CPE 400, then TS 215, responsive to the acceptance and then receipt of the call, forwards the call to CPE 400 via an idle channel of digital communications path 401.

If a redirection telephone number is not contained in the release message, then TS 205 redirects the call to a destination switch whose identity is determined as a function of the redirect code that is contained in field 604 of the associated record 600.

If, on the other hand, the received redirection number happens to be an 800 service number, then TS 205 proceeds in the manner described above. That is, TS 205 forms a request message containing the 800 service number and sends the message to NCP 225. Similarly, NCP 225 returns to TS 205 a response message. Upon receipt of the response message, TS 205 stores the new destination code (or telephone number) in field 602 of the associated call record. TS 205 may also store in respective fields 603 and 604 of the associated call record a ringing value and ring-no-answer redirection code, if that data is also contained in the response message that TS 205 receives from NCP 225. TS 205 then forwards the call to the destination switch identified by the contents of field 602 of the associated record 600. In doing so, TS 205 includes in the IAM message that it sends to the destination switch the RD flag to indicate that the call is a redirected call.

If the destination telephone number happens to be assigned to CPE 400, then TS 215 may include the RD flag in the call message that it sends to CPE 400 via the signaling channel of communications path 401. CPE 400 may then use that flag to prevent the redirected call from being redirected to another location, such as CPE 300.

Thus, as used herein, the term active call state will be taken to mean a call which progresses to the point where ringing signals are supplied to the called station, and where the call is answered (i.e., post ringing state).

Figure 4:
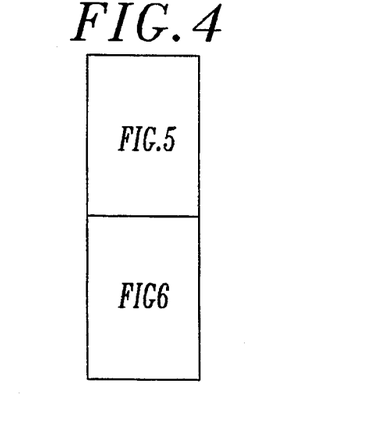
FIG. 4 shows how FIGS. 5 and 6 should be arranged with respect to one another.
Figure 5:
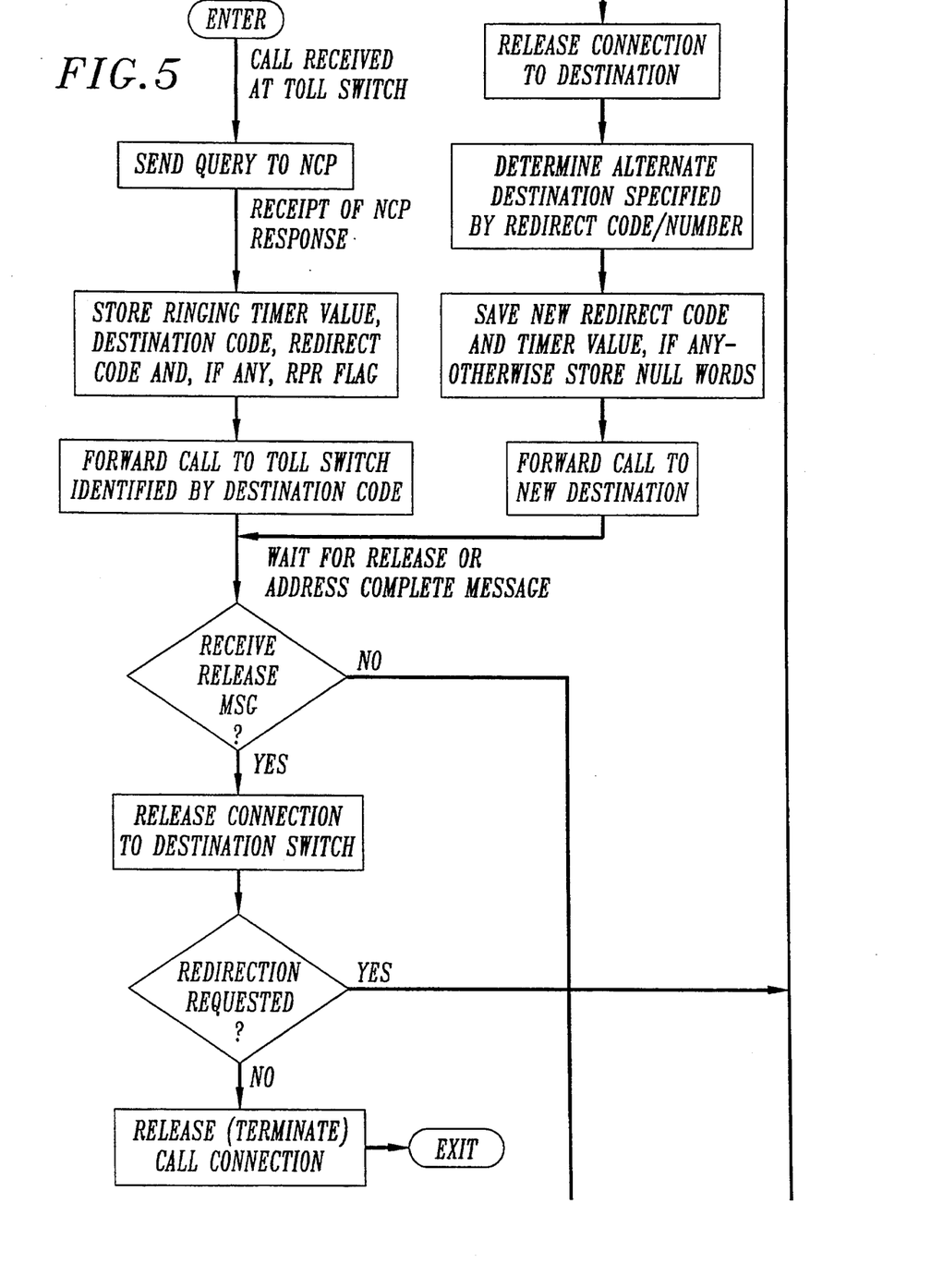
FIGS. 5 and 6 illustrate in flow chart form an exemplary program which implements the invention in a toll switch of FIG. 1.
Figure 6:
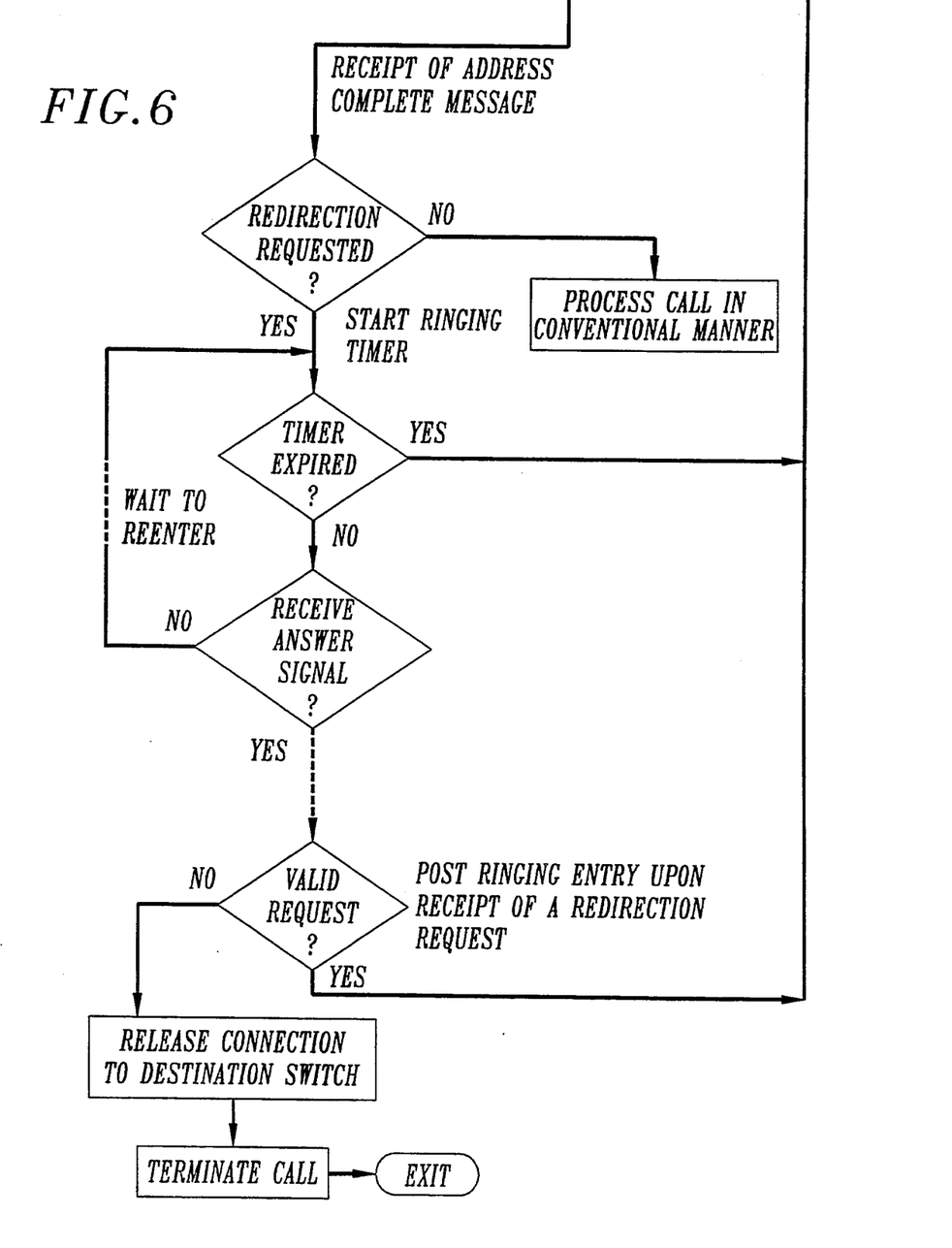

FIGS. 5 and 6, when arranged in accord with FIG. 4, illustrate in flow chart form the program which implements the principles of the invention in the toll switches of FIG. 1. In view of the fact that FIGS. 5 and 6 are self-explanatory, especially when viewed in conjunction with the foregoing detailed description, then, in the interest of conciseness, no further explanation thereof is provided herein.

The foregoing is merely illustrative of the principles of the invention. Those skilled in the art will be able to devise numerous arrangements, which, although not explicitly shown or described herein, nevertheless embody those principles that are within the spirit and scope of the invention.

We claim:

1. In a switching system comprising a plurality of switches interconnected to one another, a method for redirecting a call from one telephone station set to another telephone station set, said method comprising the steps of responding at an originating one of said switches to receipt of a call identified by a called telephone number associated with said one telephone station set by obtaining from a database system associated with said switching system at least a redirect code, said database system deriving said redirect code as a function of said called number, forwarding said call from said originating switch to a destination switch, said destination switch then responding by causing said call to be forwarded to said one telephone station set, and responding at said originating switch to either a first condition, indicating that said call has not been answered, or a second condition, indicating that a party answering said call has requested redirection of said call, by redirecting said call from said destination switch to another destination switch identified as a function of said redirect code, wherein said other destination switch then forwards said call to said other telephone station set.

2. The method set forth in claim 1 wherein said step of deriving includes the step of deriving a timer value, and wherein said step of redirecting includes the steps of periodically incrementing by a predetermined value a counter associated with said call, and invoking said first condition if a message indicating that said call has been answered is not received from said destination switch prior to the contents of said counter increasing to a value which at least equals said timer value.

3. The method set forth in claim 1 wherein said step of redirecting includes the step of responding to said redirect code being a particular telephone number by then deriving another destination code and another redirect code as a function of said particular telephone number and then redirecting said call to a destination switch identified by said other destination code.

4. The method set forth in claim 3 wherein the step of deriving said other destination code and said other redirect code includes the step of deriving another timer value and associating said other timer value with said redirected call.

5. A method of muting a call through a switching system comprising a plurality of switches interconnected to one another, said method comprising the steps of responding at an originating one of said switches to receipt of an incoming call identified by a called telephone number by deriving an associated destination code and a redirect code as a function of said called number, forwarding said call from said one switch to a destination switch identified by said destination code, said destination switch then responding by causing said call to be extended to a station set identified by said called number, and responding at said one switch to an absence of receipt within a predetermined period of time of an indication from said destination switch indicating that said call has not been answered or, if said call has been answered, receipt of an indication requesting redirection of said call by redirecting said call from said destination switch to another destination switch whose destination code is derived as a function of said redirect code.

6. The method set forth in claim 5 wherein said step of deriving includes the step of deriving a timer value as a function of said called number, and wherein said step of redirecting includes the step of responding at said one switch, following said extension of said call to said station set, by periodically incrementing a counter associated with said call and redirecting said call to said other destination switch if, prior to receipt of said indication indicating that said call has been answered, the value of said counter increases to a value at least equal to said timer value.

7. The method set forth in claim 5 wherein said step of redirecting includes the step of responding to said redirect code being another telephone number by then deriving another destination code and another redirect code as a function of said other telephone number and then redirecting said call to a destination switch identified by said other destination code.

8. The method set forth in claim 7 wherein the step of deriving said other destination code and said other redirect code includes the step of deriving another timer value and associating said other timer value with said redirected call.

9. A method for use in a switching system comprising a plurality of switches interconnected to one another, said method redirecting a call from one telephone station set to another telephone station set, said method comprising the steps of:

responding at an originating one of said switches to receipt of a call identified by a called telephone number associated with said one telephone station set by deriving an associated destination code and a redirect code as a function of said called number, forwarding said call to a destination switch identified by said destination code, said destination switch then responding by causing said call to be forwarded to said one telephone station set, and responding at said originating switch to receipt of an indication indicative of a request to redirect the call to another telephone station set by redirecting said call from said destination switch to another destination switch serving said other telephone station, in which the identity of said other destination switch is derived as a function of said redirect code.

10. A method for use in a switching system comprising a plurality of switches interconnected to one another and each connected to a centralized data base, said method being operative for redirecting a call from one telephone station set to another telephone station set, said method comprising the steps of:

responding at one of said switches to an incoming telephone call associated with a called telephone number defining a predetermined telephone service by supplying at least said called telephone number to said centralized data base, said one of said switches being an originating switch for said call, responding at said one switch to receipt from said data base of at least a telephone number associated with said one telephone station set and a call redirect code by forwarding said call to a destination switch identified as a function of the telephone number associated with said one telephone station set, and responding at said one switch to receipt from said destination switch of an indication requiring redirection of said call by redirecting said call from said destination switch to another destination switch identified as a function of said redirect code and serving said other telephone station set.

11. The method set forth in claim 10 wherein said predetermined telephone service is a 800 telephone service.

12. The method set forth in claim 10 wherein said step of forwarding said call to said destination switch includes the steps of:

periodically incrementing by a predetermined value a timer associated with said call, and responding to said timer reaching a predetermined value prior to receipt from said destination switch of an indication that said call has been completed by redirecting said call to said other destination switch.

13. The method set forth in claim 10 wherein said step of redirecting said call to said other destination switch includes the steps of:

responding to said redirect code being a particular telephone number by supplying said particular telephone number to said centralized data base, and responding to receipt from said data base of at least another redirect code by redirecting said call to a telephone station set identified as a function of said other redirect code.

14. A method for use in a switching system comprising a plurality of switches interconnected to one another, said method of redirecting a call from one telephone station set to another telephone station set, said method comprising the steps of:

responding at an originating one of said switches to receipt of a telephone call identified by a called telephone number associated with said one telephone station set by deriving at least a redirect code as a function of said called number, forwarding said call from said originating switch to a destination switch for presentation to said one telephone station set, and responding at said originating switch to a predetermined condition requiring redirection of said call by redirecting said call from said destination switch to another destination switch identified as a function of said redirect code, in which said other destination switch serves said other telephone station set and in which said predetermined condition is one of a plurality of call redirection conditions including at least ring no answer and post answer.

15. The method set forth in claim 14 wherein said step of deriving includes the step of:

deriving a timer value, and wherein said step of redirecting includes the steps of:

periodically incrementing by a predetermined value a counter associated with said call, and forwarding said call to said other destination switch if a message that said call has been answered is not received from said destination switch prior to the contents of said counter increasing to a value which at least equals said timer value.

16. The method set forth in claim 14 wherein said step of redirecting includes the step of:

responding to said redirect code being a particular telephone number by then deriving another destination code and another redirect code as a function of said particular telephone number and then redirecting said call to a destination switch identified by said other destination code.

17. The method set forth in claim 16 wherein the step of deriving said other destination code and said other redirect code includes the step of deriving another timer value and associating said other timer value with said redirected call.

18. A method of redirecting a call from one telephone station set to another telephone station set, said method comprising the steps of:

processing an incoming call received at one of a plurality of switches forming a communications system by causing information associated with said call to be translated into at least a redirect code and a destination code, said one of said plurality of switches King an originating switch for said call, forwarding said call to a destination switch identified by said destination code and serving said one telephone station set, and responding thereafter at said one switch to a condition requiting redirection of said call by redirecting said call from said destination switch to another destination switch identified as a function of said redirect code and serving said other telephone station set, said redirect code being a code other than a telephone number.

* * * * *

UNITED STATES PATENT AND TRADEMARK OFFICE
CERTIFICATE OF CORRECTION

PATENT NO : 5,369,695
DATED : November 29, 1994
INVENTOR(S): Vandana S. Chakravarti et al.

It is certified that error appears in the above-identified patent and that said Letters Patent is hereby corrected as shown below:

Column 9, line 27, "muting" should read --routing--.

Signed and Sealed this

Twenty-fourth Day of October, 2000

Attest:

Q. TODD DICKINSON

*Attesting Officer*        *Director of Patents and Trademarks*